United States Patent
Le Neel (10) Patent No.: US 9,264,520 B2
(45) Date of Patent: Feb. 16, 2016

(54) DATA TRANSMISSION UTILIZING ALTERNATE MEDIA

(75) Inventor: Tugdual Amaury Marie Le Neel, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 757 days.

(21) Appl. No.: 12/867,177

(22) PCT Filed: Apr. 22, 2010

(86) PCT No.: PCT/SG2010/000163
§ 371 (c)(1),
(2), (4) Date: Aug. 11, 2010

(87) PCT Pub. No.: WO2011/133109
PCT Pub. Date: Oct. 27, 2011

(65) Prior Publication Data
US 2011/0261794 A1  Oct. 27, 2011

(51) Int. Cl.
| H04W 84/00 | (2009.01) |
| H04W 4/00 | (2009.01) |
| H04L 29/06 | (2006.01) |
| H04W 4/14 | (2009.01) |

(52) U.S. Cl.
CPC ............... *H04L 69/14* (2013.01); *H04L 69/24* (2013.01); *H04W 4/14* (2013.01); *Y02B 60/33* (2013.01)

(58) Field of Classification Search
CPC ......... H04L 69/24; H04L 69/14; H04W 4/14; Y02B 60/33; H04B 3/54
USPC .......................................................... 370/338
See application file for complete search history.

(56) References Cited

U.S. PATENT DOCUMENTS

| 7,136,641 | B2 | 11/2006 | Pecen et al. | |
| 8,099,343 | B1* | 1/2012 | O'Neil et al. | 705/34 |
| 8,155,092 | B2 | 4/2012 | Nieves et al. | |
| 8,284,745 | B2 | 10/2012 | Noldus | |
| 2002/0080170 | A1* | 6/2002 | Goldberg et al. | 345/748 |

(Continued)

FOREIGN PATENT DOCUMENTS

| CN | 1567846 A | 1/2005 |
| JP | 2004-096169 A | 3/2004 |

(Continued)

OTHER PUBLICATIONS

Telemecanique a brand of Schneider Electric "Web Gateways and Portals" FactoryCast Gateway ETG 1000 / 3000 offer: Limitless Remote Control [Online: http://dokumentacia.schneider-electric.sk/pdf/FactoryCast_Gateways_ETG1000_ETG3000_panEN08.pdf].

White Paper IEEE, 802.11g 802.11g-WP104-R www.54g.org 16215 Alton Parkway.

(Continued)

*Primary Examiner* — Luat Phung
(74) *Attorney, Agent, or Firm* — Maschoff Brennan (57) ABSTRACT

A data transmission method for transmitting data from a first communication device to a second communication device, a data transmission system and a communication device can be provided. An identification message associated with the data is sent from the first communication device to the second communication device via a first cellular network. The data is transmitted from the first communication device via a first medium, other than the first cellular network, coupled to a server of a service provider of the cellular network, for transmission of the data to the second communication device.

17 Claims, 7 Drawing Sheets

(56) References Cited

U.S. PATENT DOCUMENTS

| | | | |
|---|---|---|---|
| 2005/0255878 A1* | 11/2005 | Leinonen et al. | 455/552.1 |
| 2006/0109827 A1 | 5/2006 | Zhang | |
| 2008/0021834 A1* | 1/2008 | Holla et al. | 705/51 |
| 2008/0049694 A1 | 2/2008 | Kinoshita et al. | |
| 2008/0082678 A1 | 4/2008 | Lorch et al. | |
| 2008/0107051 A1* | 5/2008 | Chen | 370/310 |
| 2008/0140720 A1* | 6/2008 | Six et al. | 707/104.1 |
| 2008/0259888 A1* | 10/2008 | Terashima | 370/338 |
| 2009/0089193 A1* | 4/2009 | Paintin | 705/34 |
| 2010/0041434 A1* | 2/2010 | Hirano | 455/552.1 |
| 2010/0081385 A1 | 4/2010 | Lin et al. | |
| 2010/0184440 A1* | 7/2010 | Mao et al. | 455/437 |
| 2010/0234051 A1* | 9/2010 | Holden et al. | 455/466 |
| 2011/0234379 A1 | 9/2011 | Lee | |
| 2011/0257989 A1* | 10/2011 | Kumar | 705/2 |

FOREIGN PATENT DOCUMENTS

| | | |
|---|---|---|
| JP | 2008-529325 A | 7/2008 |
| JP | 2008-544596 A | 12/2008 |
| JP | 2009-088603 A | 4/2009 |
| JP | 2010-538522 A | 12/2010 |
| KR | 10-0926165 B1 | 11/2009 |
| WO | 2004/112368 A2 | 12/2004 |
| WO | 20051115034 A1 | 12/2005 |
| WO | 2009/028928 A1 | 3/2009 |

OTHER PUBLICATIONS

International Search Report International Application No. PCT/SG2010/000163, mailed on Jun. 17, 2010.

Written Opinion Report International Application No. PCT/SG2010/000163, mailed on Jun. 17, 2010.

\* cited by examiner

DATA TRANSMISSION UTILIZING ALTERNATE MEDIA

CROSS-REFERENCE TO RELATED APPLICATION

This present application is a U.S. National Stage filing under 35 U.S.C §371 of International Application No. PCT/SG10/00163, filed on Apr. 22, 2010.

TECHNICAL FIELD

The present disclosure relates generally to data transmission techniques.

BACKGROUND

Devices, such as mobile phones, connected to cellular telecommunication networks, such as 3G networks, can typically be used to send large amounts of data over the cellular networks. The data may be in the form of, for example, electronic files.

It is recognised that an increase in data sent by users typically decreases the data transfer speeds of the networks. This in turn typically creates a need for significant investment to improve the network infrastructure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In an example embodiment, a data transmission technique is provided for transmitting or delivering data, such as large data files, using alternate media. There is provided a dual data posting and receiving procedure. This can maximize usage of existing local area networks and their associated devices.

In the example embodiment, for sending a data file from a first communication device to a second communication device, an identification message is sent from the first communication device via a cellular network. The data file itself is sent from the first communication device to the second communication device through a different media from the cellular network. The different media includes a local area network. The technique of asynchronous sending of the data file can enable secured delivery/transmission of the data file and optimize utilisation of the cellular network. Furthermore, the technique can provide cost savings for customers.

The asynchronous sending of the data file is effected at the first communication device automatically using an application loaded on the first communication device. The application allows a user such as, by way of example and not a limitation, a human user or an application process at the first communication device to select the data to be sent and the target communication device for the data to be sent to.

In an example embodiment, there is provided a data transmission method for transmitting data from a first communication device to a second communication device, the method including sending an identification message associated with the data from the first communication device to the second communication device via a first cellular network; and transmitting the data from the first communication device via a first medium, other than the first cellular network, coupled to a server of a service provider of the cellular network, for transmission of the data to the second communication device.

In some embodiments, the method further includes, upon receipt of the identification message, the second communication device making a selection of whether to receive the data via a second cellular network or a second medium other than the second cellular network.

In some embodiments, the first and second medium include the same medium.

In some embodiments, the first and second medium include different media.

In some embodiments, the first and second cellular networks are the same.

In some embodiments, the first and second cellular networks include two different networks under a roaming configuration.

In some embodiments, sending the identification message includes sending a short messaging system (SMS) initiating message.

In some embodiments, the selection includes sending a reply message to the server.

In some embodiments, sending the reply message includes sending a SMS reply message.

In some embodiments, the first medium includes one or more of a group consisting of network provider media, internet provider media, cable TV provider media and electricity provider media.

In some embodiments, the second medium includes one or more of a group consisting of network provider media, internet provider media, cable TV provider media and electricity provider media.

In some embodiments, the data is transmitted from the first communication device onto the first medium via a local area network (LAN).

In some embodiments, the LAN includes one or more of a group consisting of a Worldwide Interoperability for Microwave Access (WiMax) network and a wireless fidelity (WIFI) network.

In some embodiments, the data is received from the second medium via a local area network (LAN).

In some embodiments, the LAN includes one or more of a group consisting of a Worldwide Interoperability for Microwave Access (WiMax) network and a wireless fidelity (WIFI) network.

In some embodiments, the method further comprises selecting an outlet coupled to the second medium for transmitting the data to the second communication device based on a screening procedure.

In some embodiments, the screening procedure includes screening contactable communication devices in the vicinity of respective outlets and sending a list of the contactable communication devices to the service provider server.

In an example embodiment, there is provided a data transmission system including a cellular network; a first medium, other than the cellular network, coupled to a server of a service provider of the cellular network; a first communication device; wherein the first communication device is configured to send an identification message associated with data intended for a second communication device from the first communication device to the second communication device via the cellular network, and further wherein the first communication device is configured to transmit the data from the first communication device via the first medium, other than the cellular network, coupled to the server of the service provider of the cellular network, for transmission of the data by the server to the second communication device.

In some embodiments, the second communication device is configured to select, upon receipt of the identification message, whether to receive the data via a second cellular network or a second medium other than the second cellular network.

In some embodiments, the first and second medium include the same medium.

In some embodiments, the first and second medium include different media.

In some embodiments, the first and second cellular networks are the same.

In some embodiments, the first and second cellular networks include two different networks under a roaming configuration.

In some embodiments, the sending of the identification message includes sending a short messaging system (SMS) initiating message.

In some embodiments, the selection includes the second communication device sending a reply message to the server.

In some embodiments, the sending the reply message includes sending a SMS reply message.

In some embodiments, the first medium includes one or more of a group consisting of network provider media, internet provider media, cable TV provider media and electricity provider media.

In some embodiments, the second medium includes one or more of a group consisting of network provider media, internet provider media, cable TV provider media and electricity provider media.

In some embodiments, the first communication device is configured to transmit the data onto the first medium via a local area network (LAN).

In some embodiments, the LAN includes one or more of a group consisting of a Worldwide Interoperability for Microwave Access (WiMax) network and a wireless fidelity (WIFI) network.

In some embodiments, the data is received from the second medium via a local area network (LAN).

In some embodiments, the LAN includes one or more of a group consisting of a Worldwide Interoperability for Microwave Access (WiMax) network and a wireless fidelity (WIFI) network.

In some embodiments, the service provider is configured to select an outlet coupled to the second medium for transmitting the data to the second communication device based on a screening procedure.

In some embodiments, the screening procedure includes screening contactable communication devices in the vicinity of respective outlets and sending a list of the contactable communication devices to the service provider server.

In an example embodiment, there is provided a communication device including a first communication unit that sends an identification message associated with data intended for another communication device from the first communication device to the other communication device via a cellular network; and a second communication unit that transmits the data from the first communication device via a first medium, other than the cellular network, coupled to a server of a service provider of the cellular network, for transmission of the data to the other communication device.

In some embodiments, the transmission of the data from the first communication device via the first medium is automatic.

In some embodiments, the sending of the identification message includes sending a short messaging system (SMS) initiating message.

In some embodiments, the first medium includes one or more of a group consisting of network provider media, internet provider media, cable TV provider media and electricity provider media.

In some embodiments, the second communication unit is configured to transmit the data onto the first medium via a local area network (LAN).

In some embodiments, the LAN includes one or more of a group consisting of a Worldwide Interoperability for Microwave Access (WiMax) network and a wireless fidelity (WIFI) network.

In an example embodiment, there is provided a communication device including a first communication unit that receives an identification message associated with data from another communication device via a cellular network; and a second communication unit that receives the data from the other communication device via a first medium, other than the cellular network, coupled to a server of a service provider of the cellular network.

In some embodiments, the reception of the data from the other communication device via the first medium is automatic.

In some embodiments, upon receipt of the identification message, the second communication unit is configured to select whether to receive the data via the cellular network or the first medium other than the cellular network.

In some embodiments, the selection includes the first communication unit sending a reply message to the server.

In some embodiments, the sending of the reply message includes sending a short messaging system (SMS) reply message.

In some embodiments, the first medium includes one or more of a group consisting of network provider media, internet provider media, cable TV provider media and electricity provider media.

In some embodiments, the second communication unit is configured to receive the data from the first medium via a local area network (LAN).

In some embodiments, the LAN includes one or more of a group consisting of a Worldwide Interoperability for Microwave Access (WiMax) network and a wireless fidelity (WIFI) network.

In an example embodiment, there is provided a computer readable medium having stored thereon computer-executable instructions that, if executed, cause a processor of a first communication device to send an identification message associated with data intended for a second communication device from the first communication device to the second communication device via a first cellular network; and transmit the data from the first communication device via a first medium, other than the first cellular network, coupled to a server of a service provider of the cellular network, for transmission of the data to the second communication device.

Figure 1:
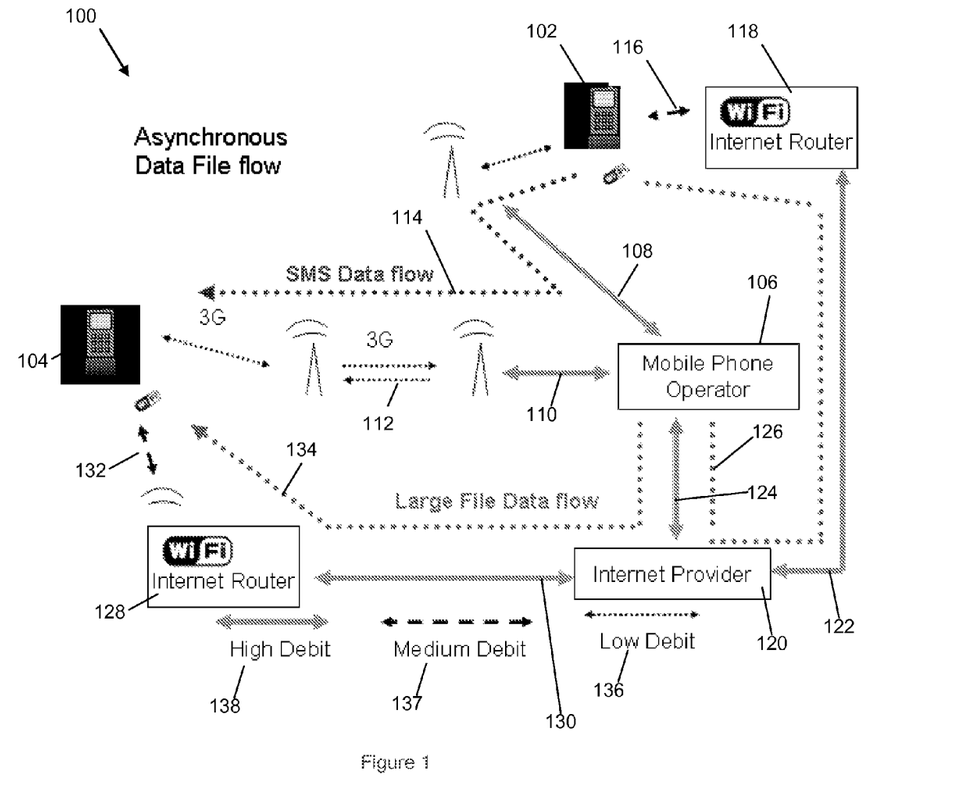
FIG. 1 is a schematic diagram illustrating a data transmission system in an example embodiment.

FIG. 1 is a schematic diagram illustrating a data transmission system 100 in an example embodiment. In the example embodiment, a first communication device such as a first phone 102 loads an application on the first phone 102. It will be appreciated that the first phone 102 may have the application pre-installed. The application allows a user of the first phone 102 to identify the data to be sent and a target, such as a second phone 104, to receive the data. Under the instruction of the application, the first phone 102 sends an identification message, for example, a short messaging system (SMS) message to a central server/provider, e.g., a mobile phone operator 106 (see transmission route 108), and the mobile phone operator 106 transmits the SMS message to the second phone 104 (see transmission route 110) via the cellular telecommunications network such as a 3G network 112. The overall SMS data flow is indicated by arrow 114.

In the example embodiment, the SMS message contains information that is associated to the data. The information can include the originating phone number (i.e., the number of the first phone 102 sending the data), number of files being sent, the file sizes, a password for the data transmission if applicable, etc. Furthermore, the SMS message also includes a text template and/or instructions for the target second phone 104 to facilitate receipt of the data, as will be described in more detail below.

In the example embodiment, also under the instruction of the application, the first phone 102 connects via a wireless local area network (WLAN) (see arrow 116), using e.g. a wireless fidelity (WIFI) connection, to a WIFI internet router 118. The internet router 118 is coupled to an internet provider 120. In the example embodiment, the internet provider 120 is connected to the mobile phone operator 106 such that data flows in high speed connections between the internet provider 120 and the mobile phone operator 106. In the example embodiment, upon connecting to the internet router 118, the first phone 102 transmits the data to the internet router 118. The data is then sent from the internet router 118 to the internet provider 120 (see arrow 122) and the internet provider 120 routs the data to the mobile phone operator 106 (see arrow 124). The overall data flow from the first phone 102 to the mobile phone operator 106 is shown using dotted line 126.

At the second phone 104, upon receipt of the SMS message, a user of the second phone 104 is given an option to select whether the user desires to receive the data from the first phone 102 via the cellular network or via a WLAN. It will be appreciated that the user in the example embodiment can be, by way of example and not a limitation, a human user or an application process. If the second phone 104 has installed an application similar to the application on the first phone 102, the application on the second phone 104 may be activated upon receipt or opening of the SMS message. A user interface of the application allows the user of the second phone 104 to select a user desired option which then generates an automated SMS reply message. Alternatively, if the second phone 104 does not have a suitable application installed, the received SMS message may be adapted to provide instructions for the user of the second phone 104 to use a text template, e.g. in the received SMS message, to manually generate a SMS reply message containing a user desired option. Thus, either automatically or by manual input, the user's desired option is sent via a SMS reply message to the mobile phone operator 106.

On one hand, if the user of the second phone 104 chooses to accept the data via a WLAN, the application installed on the second phone 104 instructs the second phone 104 to turn on a WIFI connection to connect to an internet router 128. It will be appreciated that if the second phone 104 does not have a suitable application installed, the received SMS message at the second phone 104 may contain instructions for the user of the second phone 104 to manually switch on a WIFI connection to connect to the internet router 128. At the mobile phone operator 106, upon receipt of the SMS reply message, the mobile phone operator 106 sends the data to the internet provider 120 (see arrow 124) and the internet provider 120 routs the data to the internet router 128 (see arrow 130). The internet router 128 then sends the data to the second phone 104 via the WLAN (see arrow 132). The overall data flow from the mobile phone operator 106 to the second phone 104 is shown at arrow 134. In the example embodiment, to identify the internet router 128 for sending the data to the second phone 104, a screening procedure is used. The screening procedure is described below in more detail with reference to FIGS. 3(a), (b) and 4.

On the other hand, if the user of the second phone 104 chooses to accept the data via the cellular network, upon receipt of the SMS reply message at the mobile phone operator 106, the mobile phone operator 106 transmits the data to the second phone 104 via the cellular network.

It will be appreciated that the first phone 102 consumes little resources of the cellular network (see low debit indicator 136) by sending the SMS message over the cellular network, when using the SMS asynchronous communication. In the example embodiment, the second phone 104 has a choice between selecting either a fast or a normal speed data delivery/transmission as a service. If the second phone 104 selects the fast data delivery option, i.e. by selecting the data transmission via a WLAN rather than via the cellular network, the data transmission occurs over a medium or high debit connection (see medium debit indicator 137 and high debit indicator 138 respectively). This can provide improved cellular network capacity. On the other hand, even if the second phone 104 chooses to receive the data over the cellular network, the data has already been transmitted from the first phone 102 over a WLAN to the mobile phone operator 106. This already reduces congestion of the cellular network.

In the example embodiment, the identification message on one hand and the data on the other hand, both originating from the first phone 102, are thus asynchronously transmitted to the second phone 104.

The above described example embodiment can provide an improved data transmission method and system. As data transfer speed is set by the slowest link in the transfer path, a 802.11 wireless standard (e.g. for WIFI connections) used in the above described example embodiment can provide faster transfer speeds than transferring data solely over the typical cellular networks (e.g. 2G, 3G, 3G+ networks). As an example, the 802.11g Wi-Fi speed is about 54 Mbps. There are even some "Xtreme" or "Super" networks that can work up to about 108 Mbps. In contrast, a 2.5G cellular network typically transfers data at a relatively slower speed of about 144 to 384 kbps. A 3G cellular network, at best, transfers at a speed between about 500 Kbps and about 2 Mbps.

Furthermore, apart from the 802.11 wireless standard, other alternative network media can provide significant speed advantages over the typical cellular networks. For example, wire cables used for network standards such as ADSL, ADSL2 and ADSL2+ have transfer speeds at about 8, 12, 26 Mbps respectively, measured at a minimum distance from a relay. Also, fiber optics can achieve speeds of about 100 Mbps.

Thus, in the example embodiment, it will be appreciated that data sent via alternative media from cellular networks can be faster than data transmitted purely over the cellular networks.

In the above example embodiment, although the mobile phone operator 106 is described as a separate entity in partnership/connection with the internet provider 120, it will be appreciated that the mobile phone operator 106 can be the same entity as the internet provider 120. That is, the WIFI internet routers 118, 128 may be directly operated by the mobile phone operator 106. As described, the WIFI internet routers 118, 128 can allow a momentary connection to any mobile device that desires receiving or transmitting data such as a large file.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Further, although the process flow has been described being in one direction, it will be appreciated that the connections described are capable of two-way connectivity.

In addition, although the identification message is described as originating from the first phone 102, it will be appreciated that the example embodiment can be modified to include the first phone 102 sending a trigger message to the mobile phone operator 106 and the mobile phone operator constructs the complete identification message for sending to the second phone 104.

Furthermore, although it is described that the first phone 102 uses one alternative medium other than the cellular network, i.e. the internet provider 120, it will be appreciated that one or more media can be used. That is, the data transmitted from the first phone 102 can be transmitted over a plurality of alternative media to the mobile phone operator 106, and to the second phone 104.

Further, although it is described that the same alternative medium is used to transmit data to both the first phone 102 and the second phone 104, it is appreciated that the first phone 102 and the second phone 104 can use different ones of alternative media.

In addition, it will be appreciated that the cellular networks covering the first phone 102 and the second phone 104 can include two different networks under a roaming configuration.

Figure 2:
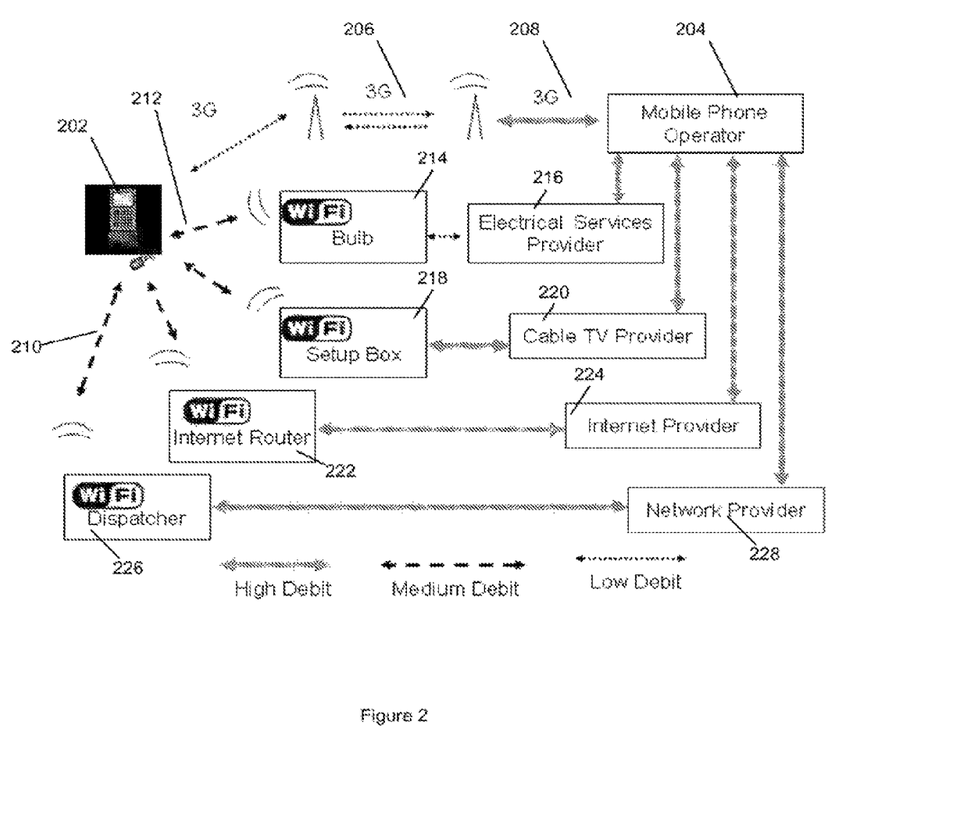
FIG. 2 is a schematic diagram illustrating different options for the alternative media in different embodiments.

FIG. 2 is a schematic diagram illustrating different options for the alternative media in different embodiments. The central server/provider can be a mobile phone operator 204. A communication device 202 is in a cellular communication network e.g. 206, 208 provided by the mobile phone operator 204. Furthermore, the device 202 can be connected to different alternative network media other than the cellular network. The different alternative network media are coupled to various WIFI devices/outlets for communication with the device 202 via WLANs e.g. 210, 212.

The WIFI devices can be installed in various devices or forms. For example, the WIFI device can be a dispatcher 226 coupled to a network provider 228. The dispatcher 226 receives data from the device 202 and sends it to the network provider 228 which in turn transmits the data to the mobile phone operator 204. The WIFI device can be an internet router 222 coupled to an internet provider 224. The internet router 222 receives data from the device 202 and sends it to the internet provider 224 which in turn transmits the data to the mobile phone operator 204. Alternatively, the WIFI device can be a setup box 218 coupled to a cable TV provider 220. The cable TV provider 220 has capacity for high speed data transfer, e.g. over optical lines, to and from the setup box 218 and the mobile phone operator 204. Alternatively, the WIFI device can be a device 214 plugged into a power socket, e.g. a bulb device, which is coupled to an electrical services provider 216. The electrical services provider 216 has capacity for high speed data transfer via power lines to and from the device 214 and the mobile phone operator 204.

It is noted that although the device 214 has a relatively low capacity link with the electrical services provider 216, it will be appreciated that using the alternative medium, i.e. the electrical services provider 216, can help to lower congestion on the cellular networks since the electrical services provider 216 may be less occupied in data transmission capacity than the cellular networks.

It will be appreciated that different types of alternative media to the cellular networks can be used in different embodiments.

It will be appreciated that most cellular communications network providers are typically also providing internet or cable TV services. Thus, such integrated provision of different network media can enable more practical synchronisation of the different SMS/data delivery/transmission services.

Figure 3A:
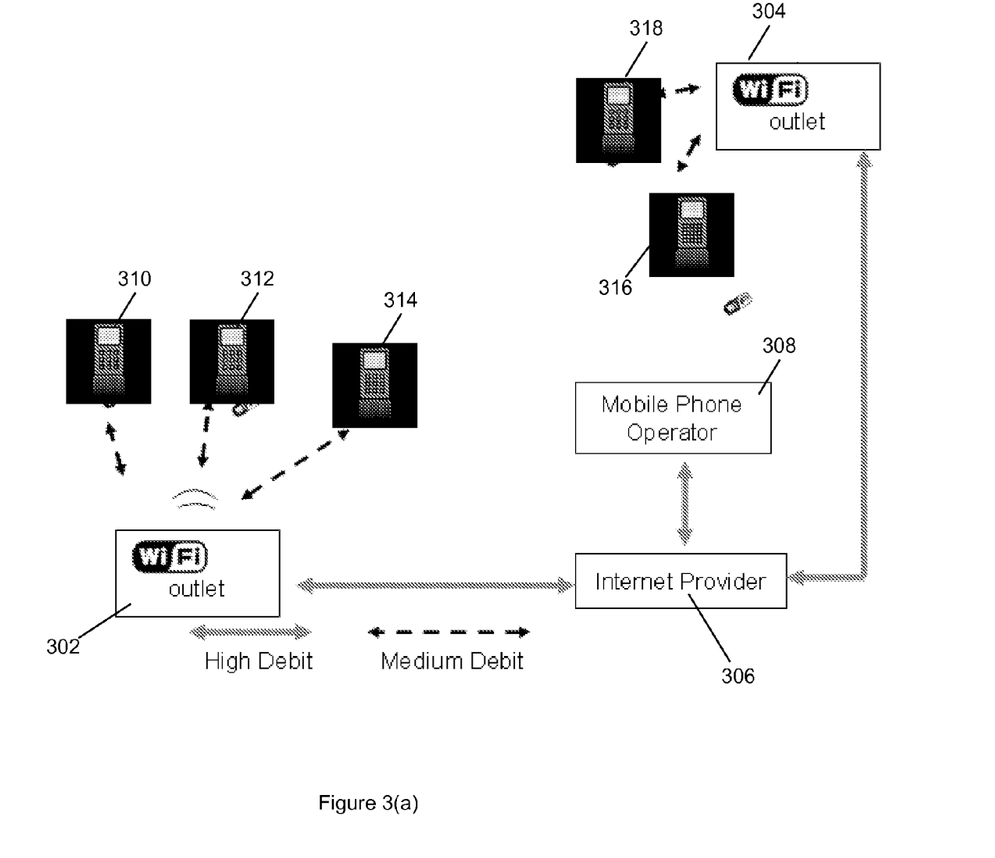
FIG. 3(a) is a schematic diagram illustrating a screening procedure in an example embodiment.

FIG. 3(a) is a schematic diagram illustrating a screening procedure in an example embodiment. In the example embodiment, WIFI outlets 302, 304 are coupled to an internet provider 306 which is in turn associated to a mobile phone operator 308. Each WIFI outlet 302, 304 screens communication devices 310, 312, 314, 316, 318 in its respective WLAN vicinity and sends a list of identification IDs of the communication devices (e.g. in the case of mobile phones, the IDs can be phone numbers) in the respective WLANs to the mobile phone operator 308. The sending of the list of identification IDs is periodical, for example but not limited to, having a periodicity of about 1 minute.

Thus, in this example embodiment, the WIFI outlet 302 sends a list containing the identification IDs of the communication devices 310, 312, 314 while the WIFI outlet 304 sends a list containing the identification IDs of the communication devices 316, 318. Therefore, using such a screening procedure, the mobile phone operator 308 can be aware of the WIFI outlets available to the communication devices for transmission or reception of data via the WIFI outlets.

It will be appreciated that although the described associated network media connected to the mobile phone operator 308 is the internet, other network media can be used.

Figure 3B:
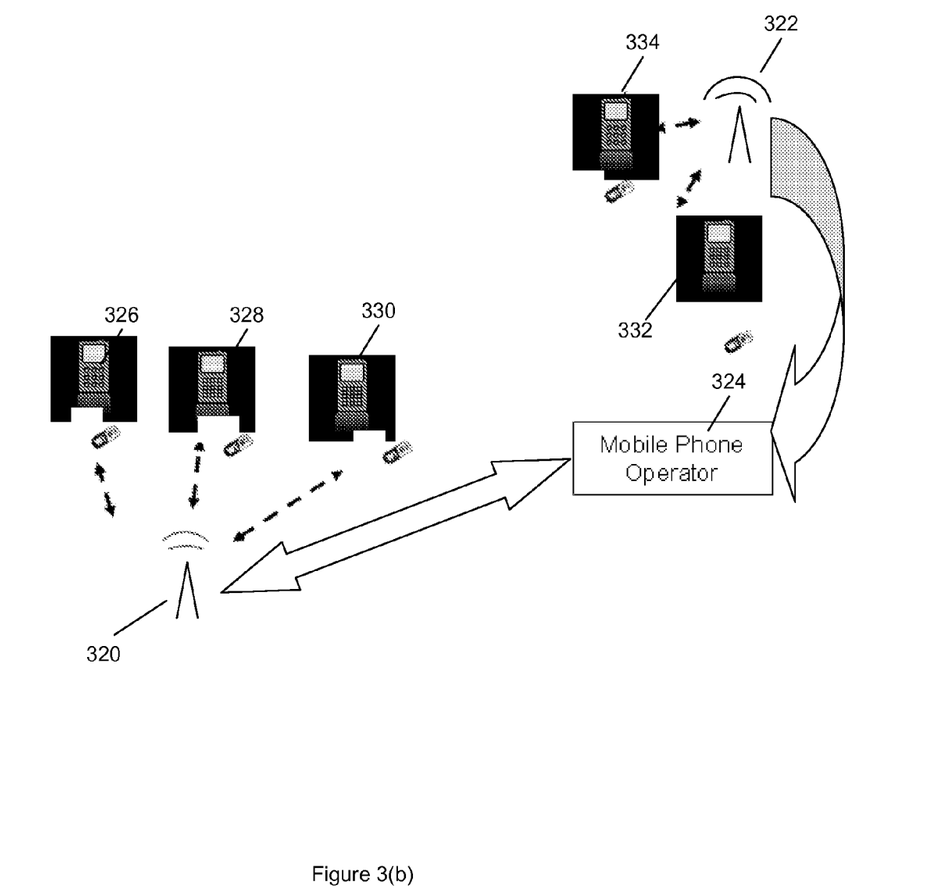
FIG. 3(b) is a schematic diagram illustrating another screening procedure in an example embodiment.

FIG. 3(b) is a schematic diagram illustrating another screening procedure in an example embodiment. In the example embodiment, cellular emission spots 320, 322 are in communication with a mobile phone operator 324. Each cellular emission spots 320, 322 screens communication devices 326, 328, 330, 332, 334 in its respective cell vicinity and sends a list of identification IDs of the communication devices (e.g. in the case of mobile phones, the IDs can be phone numbers) in the respective cell vicinities to the mobile phone operator 324. The sending of the list of identification IDs is periodical, for example but not limited to, having a periodicity of about 1 minute.

Thus, in this example embodiment, the cellular emission spot 320 sends a list containing the identification IDs of the communication devices 326, 328, 330 while the cellular emission spot 322 sends a list containing the identification IDs of the communication devices 332, 334. Therefore, using such a screening procedure, the mobile phone operator 324 can be aware of the locations of the respective communication devices 326, 328, 330, 332, 334.

Figure 4:
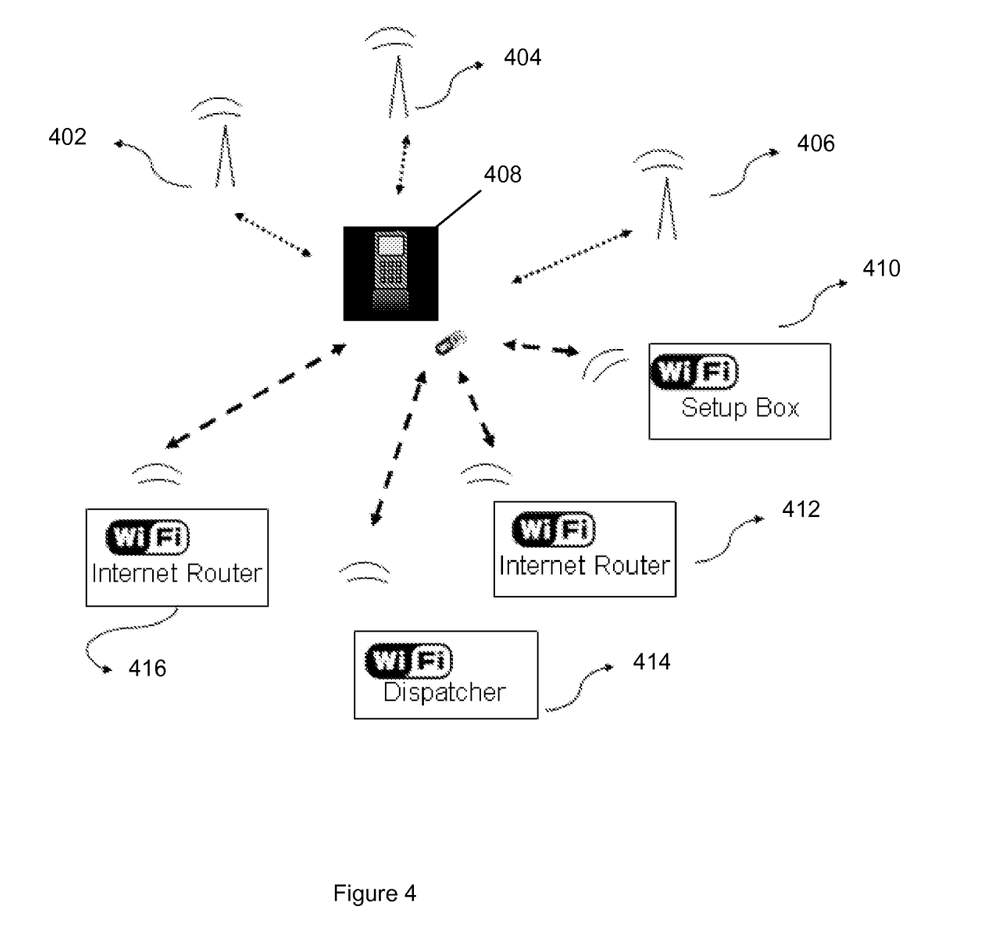
FIG. 4 is a schematic diagram illustrating usage of cellular emission spots and usage of wireless fidelity (WIFI) outlets to locate a communication device in an example embodiment.

As illustrated in FIG. 4, in the example embodiment, by using cellular emission spots such as 3G emission spots 402, 404, 406 to locate/identify a communication device 408 (compare FIG. 3(b)) and by using available WIFI outlets 410, 412, 414, 416 (compare FIG. 3(a)), a mobile phone operator can then accurately "locate" the communication device 408 for transmission or reception of data. In FIG. 4, the WIFI outlets are shown in the form of internet routers 412, 416, a setup box 410 or a dispatcher 414.

Figure 5:
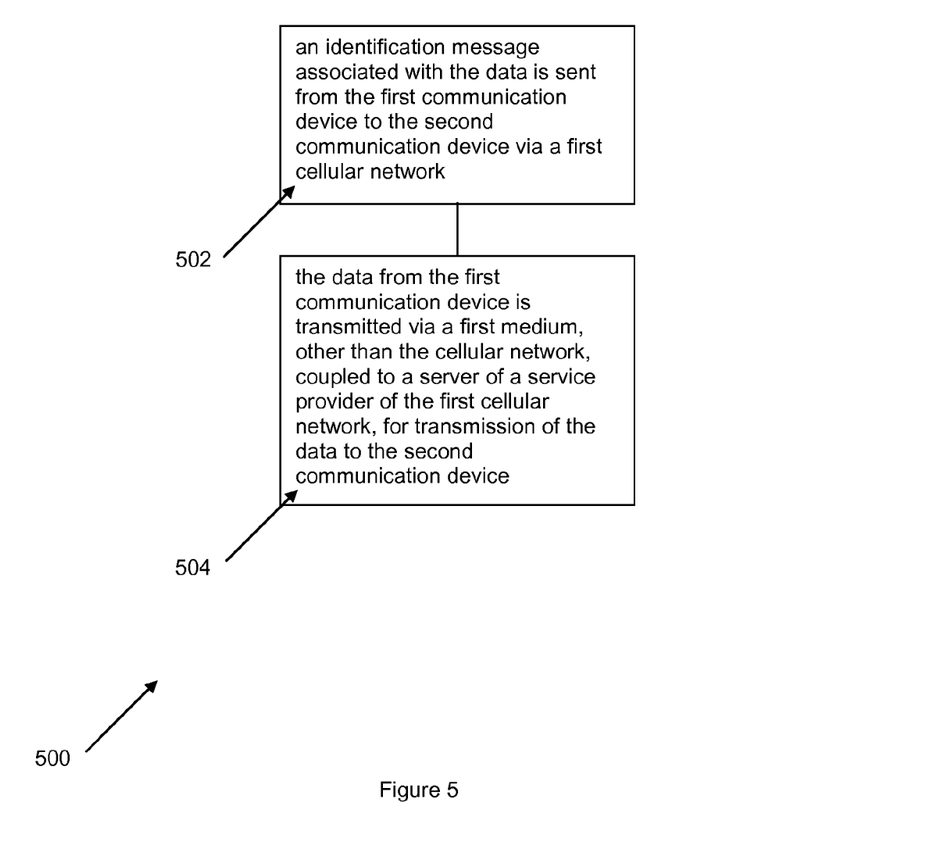
FIG. 5 is a schematic flow chart illustrating a data transmission method for transmitting data from a first communication device to a second communication device in an example embodiment.

FIG. 5 is a schematic flow chart 500 illustrating a data transmission method for transmitting data from a first communication device to a second communication device in an example embodiment. At block 502, an identification message associated with the data is sent from the first communication device to the second communication device via a first cellular network. At block 504, the data from the first communication device is transmitted via a first medium, other than the cellular network, coupled to a server of a service provider of the first cellular network, for transmission of the data to the second communication device.

Figure 6:
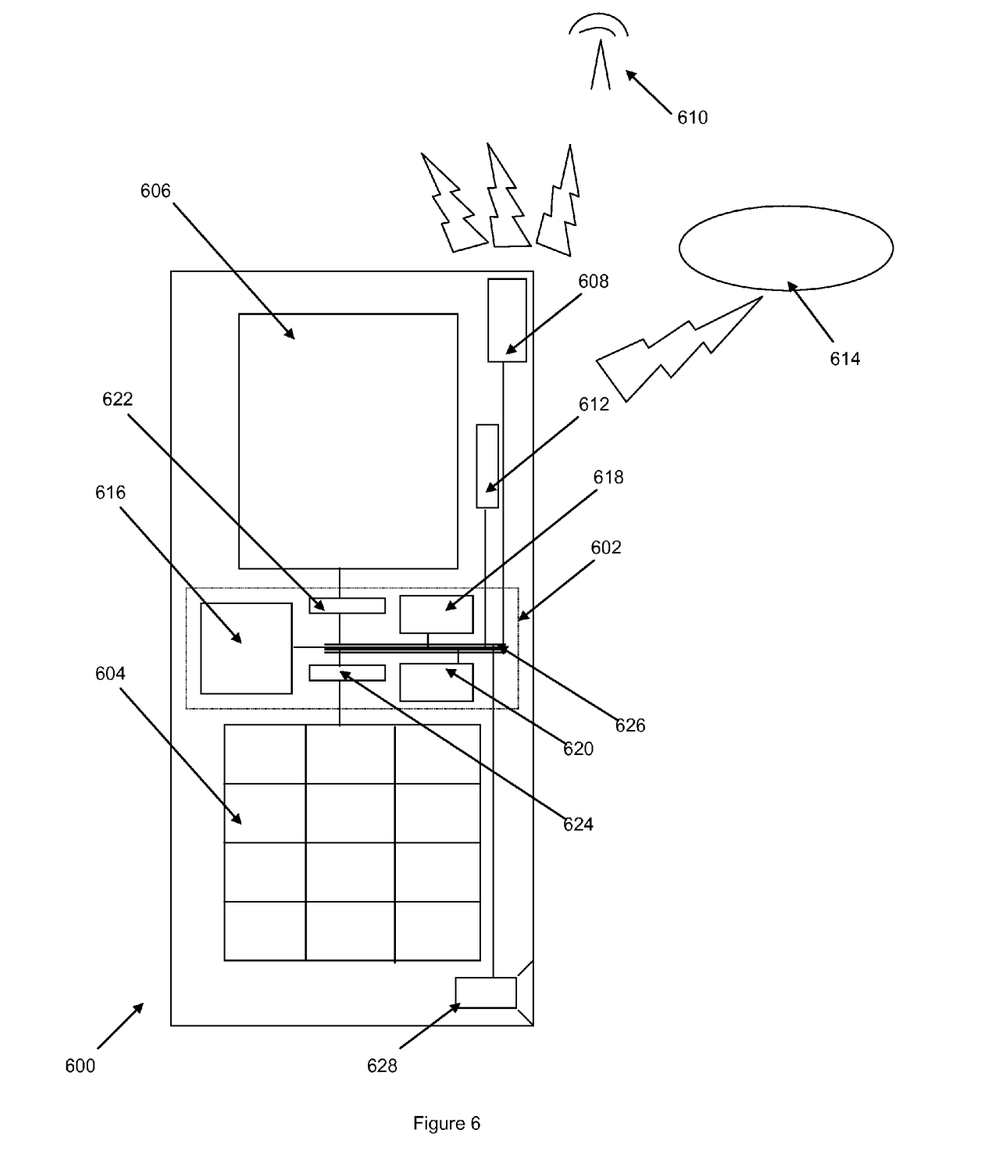
FIG. 6 is a schematic illustration of a communication device for implementing a method of the example embodiment.

The method of the example embodiment can be implemented on a communication device 600, schematically shown in FIG. 6. It may be implemented as software, such as a computer program being executed within the communication device 600, and instructing the communication device 600 to conduct a method of the example embodiment.

The communication device 600 includes a processor module 602, an input module such as a keypad 604 and an output module such as a display 606.

The processor module 602 is coupled to a first communication unit 608 for communication with a cellular network 610. The first communication unit 608 can include but is not limited to a subscriber identity module (SIM) card reader interface. The cellular network 610 can, for example, be a 3G network. The first communication unit 608 can facilitate sending and receiving of messages from the cellular network 610.

The processor module 602 is further coupled to a second communication unit 612 for connection to a local area network 614. For example, the connection can enable wired/wireless communication and/or access to e.g. the Internet or other network systems such as Local Area Network (LAN), Wireless Personal Area Network (WPAN) or Wide Area Network (WAN). The second communication unit 612 can include but is not limited to a wireless network card or an Ethernet network cable port. The second communication unit 612 can facilitate sending and/or receiving data from media other than the cellular network 610.

The processor module 602 in the example includes a processor 616, a Random Access Memory (RAM) 618 and a Read Only Memory (ROM) 620. The processor module 602 also includes a number of Input/Output (I/O) interfaces, for example I/O interface 622 to the display 606, and I/O interface 624 to the keypad 604.

The components of the processor module 602 typically communicate via an interconnected bus 626 and in a manner known to the person skilled in the relevant art.

The application program is typically supplied to the user of the communication device 600 encoded on a data storage medium such as a flash memory module or memory card/stick and read utilising a corresponding memory reader-writer of a data storage device 628. The application program is read and controlled in its execution by the processor 616. Intermediate storage of program data may be accomplished using RAM 618.

The above described example embodiments can allow mobile services companies to reduce data use of cellular network bandwidth. Furthermore, the above described example embodiments can be implemented without new infrastructure. Implementation can be carried out by using algorithms for transmitting data via local area networks.

It will be appreciated that although WIFI devices are described as the devices coupled to the alternative media in the example embodiments, the devices are not limited as such and can include other types of modems, for example, for other WLANs such as Worldwide Interoperability for Microwave Access (WiMax) etc. Furthermore, although WLANs are used in the example embodiments, the networks are not limited to only wireless formats and can include other types of networks such as those utilizing cables or fiber optics etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A data transmission method for transmitting data from a first communication device to a second communication device, the method comprising:
sending an identification message identifying the data to be sent to the second communication device, the identification message being sent from the first communication device to the second communication device via a first cellular network, wherein, upon receipt of the identification message, the second communication device is configured to make a selection of whether to receive the data via a second cellular network or a second medium other than the second cellular network;
transmitting the data from the first communication device via a first medium, other than the first cellular network, to a server of a service provider of the first cellular network, for subsequent transmission of the data to the second communication device; and
selecting an outlet coupled to the second medium for transmitting the data to the second communication device based on a screening procedure performed by one or more outlets coupled to the second medium;
wherein the screening procedure comprises each of the one or more outlets screening contactable communication devices in the vicinity of respective outlets and each of the one or more outlets sending a list of identification IDs of the contactable communication devices to the service provider server;
wherein each of the one or more outlets sends its list of identification IDs of the contactable communication devices to the service provider server periodically.

2. The method of claim 1, wherein the first and second medium comprise the same medium.

3. The method of claim 1, wherein the first and second medium comprise different media.

4. The method of claim 1, wherein the first and second cellular networks are the same.

5. The method of claim 1, wherein the first and second cellular networks comprise two different networks under a roaming configuration.

6. The method of claim 1, wherein sending the identification message comprises sending a short messaging system (SMS) initiating message.

7. The method of claim 1, wherein the selection comprises the second communication device sending a short messaging system (SMS) reply message to the server.

8. The method of claim 1, wherein the second medium comprises one or more of a group consisting of cable TV provider media and electricity provider media.

9. The method of claim 1, wherein the data is received from the second medium via a local area network (LAN).

10. The method of claim 9, wherein the LAN comprises one or more of a group consisting of a Worldwide Interoperability for Microwave Access (WiMax) network and a wireless fidelity (WIFI) network.

11. The method of claim 1, wherein transmitting the data from the first communication device via a first medium, other than the first cellular network, to a server of a service provider of the first cellular network comprises transmitting the data to the server of the service provider of the first cellular network through a bulb device plugged into a power socket coupled to an electrical services provider.

12. A data transmission system comprising,
a cellular network;
a first medium, other than the cellular network, coupled to a server of a service provider of the cellular network;
a first communication device; and
a second communication device; and
an outlet communicatively coupled to the server and to a second communication device via a second medium other than the cellular network;
wherein:
the first communication device is configured to send an identification message identifying data intended for the second communication device from the first communication device to the second communication device via the cellular network;
the first communication device is configured to transmit the data from the first communication device via the first medium, other than the cellular network, to the server of the service provider of the cellular network, for subsequent transmission of the data by the server to the second communication device via the second medium;
the outlet is configured to perform a screening procedure by screening contactable communication devices in a vicinity of the outlet and sending a list of identification IDs of the contactable communication devices to the server periodically; and
responsive to the list of identification IDs of the outlet indicating that the second communication device is one of the contactable communication devices of the outlet, the server is configured to select the outlet to transmit the data to the second communication device via the second medium.

13. The system of claim 12, wherein the first medium comprises one or more of a group consisting of network provider media, internet provider media, cable TV provider media and electricity provider media.

14. The system of claim 12, wherein the first communication device is configured to transmit the data onto the first medium via a local area network (LAN).

15. A data transmission system comprising:
a cellular network;
a first medium, other than the cellular network, coupled to a server of a service provider of the cellular network; and
a first communication device;
a second communication device; and
an outlet communicatively coupled to the server and to the second communication device via a second medium other than the cellular network;
wherein:
the first communication device is configured to send an identification message identifying data intended for the second communication device from the first communication device to the second communication device via the cellular network;
the second communication device is configured to receive the identification message via the cellular network;
responsive to receipt of the identification message, the second communication device is configured to present an option to a user of the second communication device to accept the data from the first communication device via the cellular network or via the second medium;
the second communication device is configured to receive input from the user effective to select the second medium to receive the data;
responsive to receipt of the input, the second communication device is configured to instruct the user to switch on a second medium communication interface to enable communication over the second medium;
the first communication device is configured to transmit the data from the first communication device via the first medium, other than the cellular network, to the server of the service provider of the cellular network, for subsequent transmission of the data by the server to the second communication device via the second medium;

the outlet is configured to perform a screening procedure by screening contactable communication devices in a vicinity of the outlet and sending a list of identification IDs of the contactable communication devices to the server periodically; and responsive to the list of identification IDs of the outlet indication that the second communication device is one of the contactable communication devices of the outlet, the server is configured to select the outlet to transmit the data to the second communication device via the second medium.

16. The system of claim 15, wherein the first medium comprises one or more of a group consisting of network provider media, internet provider media, cable TV provider media, and electricity provider media.

17. The system of claim 15, wherein the first communication device is configured to transmit the data onto the first medium via a local area network (LAN).

* * * * *

UNITED STATES PATENT AND TRADEMARK OFFICE
CERTIFICATE OF CORRECTION

PATENT NO. : 9,264,520 B2  Page 1 of 1
APPLICATION NO. : 12/867177
DATED : February 16, 2016
INVENTOR(S) : Le Neel It is certified that error appears in the above-identified patent and that said Letters Patent is hereby corrected as shown below:

Specification

In Column 1, Line 8, delete "§371" and insert -- § 371 --, therefor.

Claims

In Column 13, Line 63, in Claim 12, delete "comprising," and insert -- comprising: --, therefor.

In Column 14, Line 31, in Claim 13, delete "media" and insert -- media, --, therefor.

In Column 15, Line 12, in Claim 15, delete "indication" and insert -- indicating --, therefor.

Signed and Sealed this
Twenty-eighth Day of June, 2016

Michelle K. Lee
*Director of the United States Patent and Trademark Office*